United States Patent [19]
Usui

[11] Patent Number: 5,956,697
[45] Date of Patent: Sep. 21, 1999

[54] TIMER-BASED FEE-CHARGING SYSTEM FOR INTERNET

[75] Inventor: Tatsuo Usui, Tokyo, Japan

[73] Assignee: International Scientific Co., Ltd., Tokyo, Japan

[21] Appl. No.: 08/701,493

[22] Filed: Aug. 22, 1996

[30]  Foreign Application Priority Data

Jul. 11, 1996  [JP]  Japan .................................. 8-201166

[51] Int. Cl.⁶ ................................................. G06F 17/00
[52] U.S. Cl. .......................... 705/32; 705/44; 345/326; 395/200.33; 395/200.47
[58] Field of Search ................................ 705/32, 18, 44; 345/326, 335; 395/200.33, 200.47, 200.49

[56]  References Cited

U.S. PATENT DOCUMENTS 5,749,075  5/1998  Toader et al. .............................. 705/14

Primary Examiner—Thomas R. Peeso
Attorney, Agent, or Firm—Dilworth & Barrese

[57]  ABSTRACT

A timer-based fee-charging system for Internet services eliminates the inconveniences of contracting which are necessary with Internet providers as well as payments of usage fees and subscription rights, etc., and allows instant access to Internet connection services through an easy access and payment method. Such a system consists of: a terminal server to provide Internet access to clients; an authentication server to confirm whether or not a client is gaining access based on specific information input by the client; an extended authentication database, linked to the authentication server, which controls authentication data comprising specific information of, and the access status rate that indicates a predetermined available time range for access for, each client; a fee-charging server, linked with the extended authentication database, which constantly renews the access status rate by calculating access charges according to the amount of access time each client uses.

18 Claims, 2 Drawing Sheets

TIMER-BASED FEE-CHARGING SYSTEM FOR INTERNET

BACKGROUND OF THE INVENTION

The present invention relates to a way of providing access to the Internet by which many and unspecified persons will immediately be able to use it, without going through the usual procedure of making a prior contract with service providers. Specifically, it relates to a fee-charging system with a built-in time limit controlled by duration of access, with the capability of accessing in ways adaptable to providing services for many, unspecified persons. It includes an effective way of determining the likelihood of access to the Internet, a way of controlling the duration of access, a way of fee-charging and collecting money, and so on.

When an individual accesses the Internet, they usually do it through a service provider who is in charge of making the connection. In order for that to happen, a certain procedure has to be completed in advance so the provider has the information needed for making the connection, and deciding a method of payment. Information needed for making the connection includes log-in names, passwords and so on. The method of payment involves utilizing a credit card, or setting up direct withdrawal from an account with some financial institution, such as a bank, with a bill of charge sent by mail, and so on. Because an individual person has to go through such procedures, it takes quite a few days before he is actually able to use the Internet.

But among those who desire to utilize the Internet, some have no time to waste going through such troublesome procedures and want to start searching on the Internet immediately, as it relates to their business concerns. Others do not think they will use the Internet so often, so it is not worthwhile going through the regular registration. Still, they would like to try it now and then, just whenever they feel like it, if possible. And still others do not even have a personal computer, but would like to try it someday if they had a chance.

Finally, some have already registered with a service, but desire to utilize it more efficiently and without unnecessary extra charges. They have found situations where the service does not work in the usual way in certain places they make a business trip to, and also in other certain places, and a lot of them have this or that trouble in various kinds of situations. For such people, the present Internet system has a "closed" aspect which is troublesome, and which cannot meet their individual needs.

Currently, in response to such people's needs and requests, and as a way to make it possible for many and unspecified people to use the Internet easily, a system of providing third-person service utilizing the Internet is suggested in some specific places on the Internet, for example on a place named Internet Cafe. Such services are based on a system of fee-charging by time, with a fixed fee for a limited time; or they are based on a system of fee-charging according to time, calculated from the time of entering to time of leaving the place.

However, the kind of fee-charging system for providing the service mentioned above is not based on the fee-charging system of the Internet itself, but on the places or facilities which provide the service. Due to the inflexible characteristics of a superficial fee-charging system, such as by calculating elapsed time, it cannot be said that this kind of system is a fair and correct way of fee-charging—as would be, for example, one figured from whether or not a person actually used the Internet.

The fee-charging system of the Internet is based on the calculations of a host computer, with a result sent by a terminal server at the time of connecting, and when cutoff or clearing is complete. It cannot calculate the charge until the connection is cut. Therefore, having a predetermined fee (as mentioned above), or a fee based on the time of entering and leaving the place, with no consideration given to the actual connection time, accounts for a big proportion of the charges for the facilities—except for those using the Internet. This cannot be appropriate as a system of fee-charging for those who desire a timely way to use the Internet without registering.

SUMMARY OF THE INVENTION

The present invention is meant to deal with the above-mentioned problems. By the completion of this invention as explained below, some troublesome aspects—that is, the procedure of contracting with dealers and paying for the use and registration, which are all necessary to connect to the Internet—can be omitted. By this easy and handy access to it, first of all, and by its appropriate fee-charging system, the present invention has been able to fulfill its goal.

The present invention is composed of a terminal server—which can provide connections to the Internet for many and unspecified clients, and an extended authentication data base, which can precisely manage the maximum amount of authentication data. This data consists of specific (personal) information—such as a unique log-in name and password—which responds to each client, and authentication data which consists of the access status rate, to indicate a predetermined available time for use. This is programmed in advance, in relation to the specific personal information, as above. The authentication server interlocks with a specific extended authentication data base to check access status to the Internet, according to a command from a specific terminal server, based on the specific information input(ted) by the client. The fee-charging server is interlocked with the specific extended authentication data base which calculates the fee for access according to the length of the time each client is connected, and constantly renews the access status rate of each authentication data of a specific extended authentication data base.

It checks the access status to the Internet according to the specific information input each time. Then—at the time of accessing the Internet, and once it is connected—within some limited time (that is, until the access status rate, which is controlled by its specific extended authentication data base, falls below zero), the present invention provides access service to the Internet regardless of whether it is for constant use, or for intermittent use.

DESCRIPTION OF THE PREFERRED EMBODIMENTS

Figure 1:
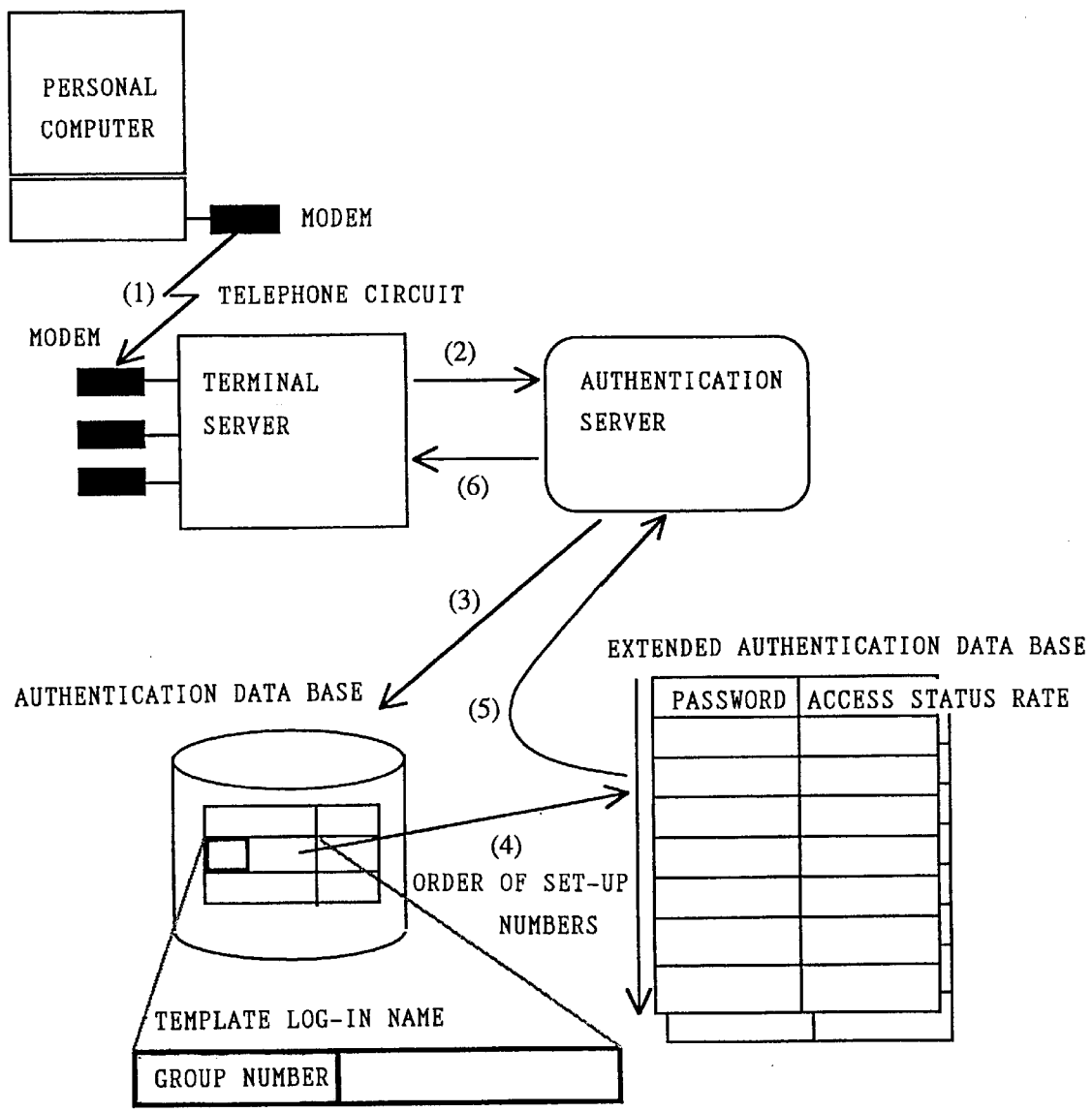
FIG. 1 is a simplified drawing showing the method of authentication of the present invention.

The present invention is composed of a terminal server, which provides access to Internet for clients; an authentication server, which checks to determine-accessibility to the Internet according to the specific information input by a client; and an extended authentication data base, which controls the authentication data consisting of specific information from each client; and an access status rate number to show access time, which is thus already programmed in advance, interlocking with the specific authentication server; and a fee-charging server, linked with the extended authentication data base, which constantly renews the access status rate by calculating access charges according to the amount of access time each client used.

Also—concerning the specific extended authentication data base-one recording unit of authentication data base in the authentication server is composed of numerous authentication data which can be distinguished from each other.

This means it is necessary to make it possible to register many log-in names which can respond to many and unspecified clients in order to provide access service, although only one log-in name can be registered in a data base for the UNIX machines now, and only one integral number used in the program is given to each.

Accordingly, in order to control many log-in names efficiently and to distinguish clearly between them, the way to make it work is to create and register a lot of template log-in names for one recording unit under each authentication data base by combining a unique series of numbers. Or arbitrarily set some letters of symbols to describe a series of numbers.

Also, the authentication data of the present invention is made of a record of a fixed length, which means its authentication data for each of the recording units is all the same length, so that it is easy to find the specific authentication data out of one recording unit made up of numerous authentication data.

Also, the authentication server of the present invention checks the propriety of the individual information which was input by a client, through a command from the terminal server, according to whether or not the authentication data which responds to the client was taken out from the extended authentication data base. And it is made so that it reports the result to the specific terminal server.

Also, the fee-charging server of the present invention calculates the charge of access after checking the access time by finding out the access situation of each client in each fixed time from the terminal server, and controls the access status rate. At the same time, it informs the specific terminal server if it's possible to continue access. Or, according to the information which is sent from the terminal server in each fixed time, it checks the time of access and calculates the charge for access and controls the access status rate, and then lets the specific terminal server know if it is possible to continue access.

Also the present invention is made to work with the http server, which starts the action of the program to make it possible for each client to search and check their own access status rate through their own free access to it, interlocking with the extended authentication data base.

Also, the present invention is made to work with the http server, which starts the action of the program to make it possible for each client to search and check their own access status rate, for getting information about fee-charging from the Internet, interlocking with the extended authentication data base.

Further, the present invention enables the information, input by clients at the time-of accessing the Internet, to be controlled by printing each authentication data on a card, so that it is possible to have it connected by the act of inputting specific information from a keyboard. It is also possible to have it connected by inserting a specific card into a recorder which is connected to a personal computer, as it is controlled by the record memories in each authentication data with magnetic signals on the card.

Following is an explanation of an actual example of the present invention at work, according to the drawing.

In order to receive the connection service to the Internet, clients first of all have a connection with the terminal server. In the terminal server, multiple numbers of "ports" are prepared, and each port is connected with a modem and is made so as to provide connection service to the Internet for clients by way of a telephone network [See FIG. 1(1)].

The clients who request access to the Internet input the individual information indicated, and after the terminal server judges if it is possible to gain access (according to the client's individual information which is input) and, as a result of that, finally it can be connected to the Internet. When commanded by the terminal server [See FIG. 1 (2)], the client[<b]old3 s specific information, already input, is checked to see if access is possible, according to whether the authentication data which responds to the client was able to be found in the extended authentication data base, with which the authentication server interlocks [See FIG. 1 (3), (4), (5)], and the result goes to the specific terminal server [See FIG. 1 (6)].

The extended authentication data base is made to control the authentication data, which consists of personal information—such as numerous log-in names and passwords, which respond to many clients, and the access status rate number which shows how long a client can have access, as one recording unit using the key of a log-in name. And one recording unit of the authentication data base in the authentication server is composed of many of the above-mentioned authentication data.

As the method for composing the authentication data, make a template log-in name by combining a unique set of numbers and a random set of numbers, for which some letters or symbols can be used to describe a series of numbers—unique for each recording unit in the authentication data base, and authentication data which responds to each specific template log-in names is created. For instance, for each recording unit of the authentication data base, a group number is decided such as ISP-GROUP 1, ISP-GROUP 2, ISP-GROUP 3, and so on. Further, for each set of numbers, a series of numbers—of random numbers or figures (for which some letters or symbols are used to make up a series of numbers), are created. For example, if the set numbers are a series of 4 figures from 0 to 9, per one group number as above, 104 of set numbers can be created such as 0000, 0001, 0002. . . up to 9997, 9998, 9999. And if the set numbers are a series of 4 figures using alphabetical letters, per one group number as above, $26^4$ of set numbers can be created, such as AAAA, AAAB, AAAC, to ZZZX, ZZZY, ZZZZ. In this way, numerous template log-in names are created in the authentication data base, and it becomes possible to make access to many, and unspecified, clients.

Therefore, the individual information which is input by clients is to be checked for propriety as follows.

1. With the key of a log-in name, which is input by the client, it is sought out of the authentication data base in the authentication server. When the specified authentication data is found, its contents are read and respond successfully to the terminal server, and access is permitted to the specific client [See FIG. 1 (3)].

2. In case the above (1) fails, template log-in takes place, based on the part of group number of the specific log-in name, and the specified log-in name is sought in the authentication data base. When a log-in name is found, its contents are read; in case it is not found, the response is failure [See FIG. 1 (4)].

3. When the specified log-in name is found in the above (2), the specified contents are read out of the extended authentication data, based on the log-in name, then the terminal server receives successful permission to connect to the specific client, and link with the results as above (2) [See FIG. 1 (5) & (6)].

Figure 2:
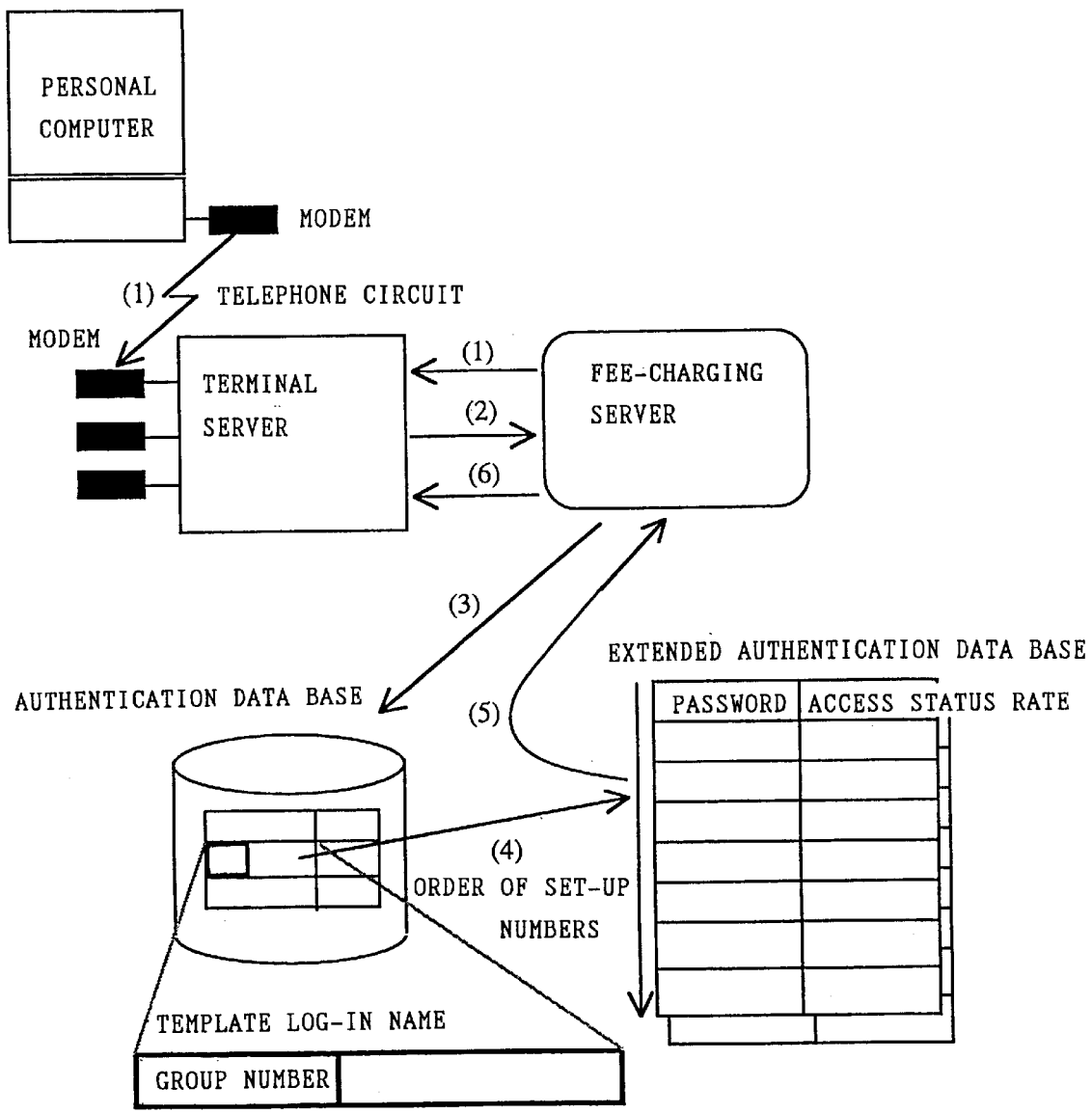
FIG. 2 is a simplified drawing showing the method of fee-charging of the present invention.

The fee-charging server checks the access time by inquiring about each client's access situation from the terminal server for every fixed length of time [See FIG. 2 (1) & (2)]. It calculates each charge for access and constantly renews the access status rate numbers in the authentication data [See FIG. 2 (3), (4), (5)], and it also informs the specific terminal server if it is possible to continue access [See FIG. 2 (6)].

It follows that the log-in names which were charged in the previous use, and the time which charging started, are prepared for each port in the terminal server. The log-in name of the client who is being connected is obtained in each port by way of the terminal server, in every fixed length of time. In case it is not logged-in, a special log-in name, which makes it possible to judge that it is not logged-in, can be obtained. In case the log-in name of a client who wants access is obtained, the fee for it is to be collected by repeating the action of the following method, regularly, to each port, based on the log-in name.

1. In case the log-in name does not match the log-in name which was charged for the previous use, the fee time is to be for the present time.
2. In case a client has logged in already, and the present time is more than the fee time, the access fee is calculated from the access time and is to be charged from the access status rate of the authentication data according to the access status rate for each time. If the specified access status rate falls below zero, the port resets, and the connection is cut.

Also, for the sake of connecting to the Internet, the connecting information input by a client is controlled by printing it on a card for each authentication data, so that it can be connected by the act of inputting specific information with a keyboard. Or the information can be controlled by being recorded on a card with magnetic codes for each authentication card, and it is also possible to have it connected by inserting the specific card into a recorder which is connected with a personal computer. At that time, the items of information which are to be printed (on a card in the former case), include access status rate number, support URL, domain name, domain name server IP-address, POP server name, log-in name, password, and so on.

It is better if clients only have to input their log-in names and passwords, which is their personal information, and to have other information other than that in a personal computer in advance.

Also, the present invention is free from any limitations concerning the use of the Internet—it is possible to make a group of programs which work with an http-server, such as a program made from checking the access status rate, whereby clients can check their access status rate by their own free access to it; and such as a program for adding access status rate by which clients can add and sum up their access status rate by their own operation; and such as a program for fee-charging for information, by which the access status rate of the authentication data are deducted/charged for the chargeable information on the Internet, and so on; and it is also possible to have it combined with a WWW (World-Wide Web)-browser which can designate the URL to be indicated at the beginning, and then to have some specific WWW page indicated. So, it is noteworthy that the environment is set freely by those who provide the Internet service for use.

As for what has been mentioned until now, the following may be noted regarding the present invention: not only the fact that the present troublesome procedures—i.e., the procedure of making a contract with dealers and making payments for use and for joining, which are inevitable for access to the Internet, can be omitted—but also the utilization of the Internet can be provided widely to many and unspecified people, by the present invention's proper and assured method of fee-charging, and by the handy and simple access to it.

Additionally, there is no need to use it continuously or all at one time—only as much as is programmed in advance by the access status rate-because access status rate is firmly controlled in the extended authentication data base. It is possible to use it "on and off," only when , and only as as much, as is necessary. It is assured that the user will receive as much of the access service as needed, as long as the access status rate lasts; and at the same time, it becomes totally impossible for anyone to steal data, such as the access status rate lasts, etc., or alter data, and so on.

Also, it is possible to accomplish discrimination of the authentication data in the extended authentication data base by a large number of combined template log-in names, by sets of numbers and letters or marks, or symbols for the arbitrarily-set numbers. So, it becomes possible to program various access status rates, which are adjustable to many clients' various needs.

Also, because all the authentication data is made to be a record of the same fixed length, searching for the specific authentication data, under the template log-in name-for which some letters or marks to describe a series of numbers are used-is easily done by taking the product of the record of a fixed length, which responds to the specified template log-in name, without going through each specified authentication data one by one, even when the amount of recognition data gets huge.

Further, it is possible for clients to check their access status rate through their own free access to it; therefore, their utilization of the Internet can be planned according to how many points or units are left. Also, by making it possible for clients to add and sum up the access status rate through their own operation, a sudden and unexpected connection cut-off, due to depletion of the access status rate, can be avoided. And the half-used access status rate points can be summed up and controlled as one. Also, fee-charging for the chargeable information can be taken care of from the access status rate of the authentication data. So again a wider range of use can be offered.

Additionally, with the fee-charging system of the present invention, the access status rate points can be decided in advance in each kind of authentication data. So it becomes possible, for example, for an enterprise to utilize it as a kind of gift card, which is pre-paid and which has an advertising aspect, by indicating a specified WWW page for a certain time, and by making a combination with the WWW-browser which can designate the URL to be indicated at the beginning.

What is claimed is:

1. A timer-based fee-charging system for Internet services comprising:
   a terminal server to provide Internet access to clients;
   an authentication server to confirm whether or not a client is gaining access based on specific information input by the client upon instruction from said terminal server;

an extended authentication database, linked to the authentication server, which controls authentication data comprising specific information of, and the access status rate that indicates a predetermined available time range for access for, each client;

a fee-charging server, linked with the extended authentication database, which constantly renews the access status rate by calculating access charges according to the amount of access time each client used;

the timer-based fee-charging system features the capability to provide Internet access services to a client until the access status rate of the client controlled by the extended authentication database falls below 0, featuring an http server linked with the extended authentication server, operates a program that enables a client who accesses the server freely to add up the access status rate into a total when the client owns several information units.

2. The timer-based fee-charging system for Internet services, as claimed in claim 1, featuring the extended authentication database that constitutes one recording unit of the authentication database of the authentication server as numerous distinguishable authentication data.

3. The timer-based fee-charging system for Internet services, as claimed in claim 2, featuring distinction of numerous authentication data through registration of template log-in names that, for each lot of authentication data, combine a set number and a group number-random digit numbers within the group employing characters or signs that describe serial numerals.

4. The timer-based fee-charging system for Internet services, as claimed in claim 1, featuring authentication data made up of fixed-length records of the same length.

5. The timer-based fee-charging system for Internet services, as claimed in claim 1, featuring an authentication server that confirms access status to the Internet according to whether authentication data based on, or corresponding to, the specific data input by a client is abstracted from the extended authentication database, and that notifies the result thereof to the terminal server.

6. The timer-based fee-charging system for Internet services, as claimed in claim 1, featuring a fee-charging server that controls the access status rate by calculating the access charge after confirming access time by contacting the terminal server to inquire about the access status of each client in specified time intervals, and that notifies the terminal server of whether or not access may be allowed to continue.

7. The timer-based fee-charging system for Internet services, as claimed in claim 1, featuring a fee-charging server that controls the access status rate by calculating the access charge after confirming access time with notices sent from the terminal server in specified time intervals, and that notifies the terminal server of whether or not access may be allowed to continue.

8. The timer-based fee-charging system for Internet services, as claimed in claim 1, featuring management of the information input by a client for Internet access by printing such input information on a card for each authentication data, and enabling access after the information is input through a keyboard.

9. The timer-based fee-charging system for Internet services, as claimed in claim 1, featuring management of the information input by a client for Internet access by recording such input information on a card for each authentication data with magnetic signals, and enabling access after the card is read by the recorder connected to a personal computer.

10. A timer-based fee, fee-charging system for Internet services comprising:

a terminal server to provide Internet access to clients;

an authentication server to confirm whether or not a client is gaining access based on specific information input by the client upon instruction from the terminal server;

an extended authentication database, linked to the authentication server, which controls authentication data comprising specific information of, and the access status rate that indicates a predetermined available time range for access for, each client;

a fee-charging server, linked with the extended authentication database, which constantly renews the access status rate by calculating access charges according to the amount of access time each client used;

the timer-based fee-charging system features the capabilities to provide Internet access services to a client until the access status rate of the client controlled by the extended authentication database falls below 0, featuring an http server linked with the extended authentication server, operates a program that enables the collection of charges for fee-charged services on the Internet on the basis of the access status rate in the authentication data of the client.

11. The timer-based fee charging system for Internet services as claimed in claim 10, featuring the extended authentication database that constitutes one recording unit of the authentication database of the authentication server as numerous distinguishable authentication data.

12. The timer-based fee charging system for Internet services as claimed in claim 11, featuring distinction of numerous authentication data through registration of template log-in names that, for each lot of authentication data, combine a set number and a group number-random digit numbers within the group employing characters and signs that describe serial numerals.

13. The timer-based fee charging system for Internet services as claimed in claim 10, featuring management of the information input by a client for Internet access by recording such input information on a card for each authentication data with magnetic signals, and enabling access after the card is read by the recorder connected to a personal computer.

14. The timer-based fee-charging system for Internet services, as claimed in claim 10, featuring authentication data made up of fixed-length records of the same length.

15. The timer-based fee-charging system for Internet services, as claimed in claim 10 , featuring authentication server that confirms access status to the Internet according to whether authentication data based on, or corresponding to, the specific data input by a client is abstracted from the extended authentication database, and that notifies the result thereof to the terminal server.

16. The timer-based fee-charging system for Internet services, as claimed in claim 10, featuring a fee-charging server that controls the access status rate by calculating the access charge after confirming access time by contacting the terminal server to inquire about the access status of each client in specified time intervals, and that notifies the said terminal server of whether or not access may be allowed to continue.

17. The timer-based fee-charging system for Internet services, as claimed in claim 10, featuring a fee-charging server that control the access status rate by calculating the access charge after confirming access time with notices sent from the terminal server in specified time intervals, and that notifies the said terminal server of whether or not access may be allowed to continue.

18. The timer-based fee-charging system for Internet services, as claimed in claim 10, featuring management of the information input by a client for Internet access by printing such input information on a card for each authentication data, and enabling access after the said information is input through a keyboard.

* * * * *